US 8,350,911 B2

(12) United States Patent
Gennari et al.

(10) Patent No.: US 8,350,911 B2
(45) Date of Patent: Jan. 8, 2013

(54) METHOD AND SYSTEM FOR MONITORING AN ENVIRONMENT

(75) Inventors: Giambattista Gennari, Vicenza (IT); Giorgio Raccanelli, Vicenza (IT); Ruggero Frezza, Padua (IT); Angelo Cenedese, Padua (IT); Fabio D'Alessi, Treviso (IT)

(73) Assignee: Videotec S.p.A., Vicenza (IT)

( * ) Notice: Subject to any disclaimer, the term of this patent is extended or adjusted under 35 U.S.C. 154(b) by 326 days.

(21) Appl. No.: 12/600,868

(22) PCT Filed: May 9, 2008

(86) PCT No.: PCT/IB2008/001172
§ 371 (c)(1),
(2), (4) Date: Apr. 23, 2010

(87) PCT Pub. No.: WO2008/142504
PCT Pub. Date: Nov. 27, 2008

(65) Prior Publication Data
US 2010/0214417 A1    Aug. 26, 2010

(30) Foreign Application Priority Data
May 19, 2007    (IT) .............................. MI2007A1016

(51) Int. Cl.
*H04N 7/18* (2006.01)
(52) U.S. Cl. ........................................ 348/159; 340/3.1
(58) Field of Classification Search .................. 348/159; 340/3.1
See application file for complete search history.

(56) References Cited

U.S. PATENT DOCUMENTS

| 4,992,866 | A  |   | 2/1991 | Morgan |
| 6,097,429 | A  | * | 8/2000 | Seeley et al. .................. 348/154 |
| 6,437,819 | B1 |   | 8/2002 | Loveland |
| 7,924,311 | B2 | * | 4/2011 | Yoshida et al. ............... 348/159 |
| 2003/0085992 | A1 |   | 5/2003 | Arpa et al. |
| 2006/0004579 | A1 |   | 1/2006 | Claudatos et al. |

(Continued)

FOREIGN PATENT DOCUMENTS

WO    WO99/35850    7/1999

(Continued)

OTHER PUBLICATIONS

International Preliminary Report on Patentability for PCT/IB2008/001172.

(Continued)

*Primary Examiner* — Moustafa M Meky
(74) *Attorney, Agent, or Firm* — Buchanan Nipper

(57) ABSTRACT

The invention relates to a method for monitoring an environment through a plurality of sensors, wherein a control system receives information from one or more sensors of said plurality and uses said information in order to monitor said environment. The method comprises a setup stage wherein an operator creates a model of an environment by defining a plurality of cells corresponding to areas of said environment, and then creates cell/sensor relationships by defining for each sensor at least one possible position which is associated with at least one cell. For each position the sensor is assigned by the operator a monitoring judgment for the associated cell. The method also comprises an operational stage wherein the control system, in order to perform a surveillance function, finds those sensors which can be used for carrying out the requested surveillance function and controls them based on the monitoring judgments and the cell/sensor relationships.

35 Claims, 4 Drawing Sheets

U.S. PATENT DOCUMENTS

2008/0225121 A1 * 9/2008 Yoshida et al. ............... 348/159

FOREIGN PATENT DOCUMENTS

| WO | 0056056 A2 | 9/2000 |
| --- | --- | --- |
| WO | WO03/030550 | 4/2003 |
| WO | WO03/051059 | 6/2003 |
| WO | 2006067947 A1 | 6/2006 |
| WO | WO2007/094802 | 8/2007 |

OTHER PUBLICATIONS

International Search Report for PCT/IB2008/001172.

Manoj et al: "On the use of limited autonomous mobility for dynamic coverage maintenance in sensor networks", Mar. 23, 2007, Computer Networks, Elsevier Science Publishers B.V., Amsterdam, NL, pp. 2126-2143, XP005936332, ISSN: 1389-1286.

EPO communication pursuant to Article 94(3) EPC, EP2163094 (National Phase entry of PCT/IB2008/001172 in the European Patent Office), dated Sep. 8, 2011.

EPO communication pursuant to Article 94(3) EPC, EP2163094 (National Phase entry of PCT/IB2008/001172 in the European Patent Office), dated Sep. 3, 2010.

Rowaihy, et al: "A Survey of Sensor Selection Schemes in Wireless Sensor Networks," Proc. SPIE 6562, 65621A (2007) (cited by the Federal Service for Intellectual Property (Russian Federation) during examination of the National Phase entry of PCT/IB2008/001172 in Russia).

* cited by examiner

METHOD AND SYSTEM FOR MONITORING AN ENVIRONMENT

The present invention relates to a surveillance method for monitoring an environment according to the preamble of claim 1.

The invention also relates to a system adapted to implement said surveillance method.

In many situations, from public places to private companies, there is a need to monitor an environment for the purpose of detecting any anomalous events such as theft, vandalic acts, aggression, robbery, and in general any events that may put people and property at risk.

To this end, surveillance systems are commonly used wherein a plurality of sensors, such as video recording devices (e.g. video cameras) or motion sensors (e.g. infrared or volumetric sensors), monitor different areas of the environment in question.

The information signals sent by the sensors (e.g. a video of a room or an alarm signal of a sensor) are received by a monitoring station attended by a watchman.

Known surveillance systems require a setup stage that focuses on the sensors.

During this setup stage, a model of the system is created which defines, for each sensor, a monitored area and the adjacent sensors, i.e. the sensors that monitor the border of said area.

Thus, during the tracking procedures the system will follow the tracked subject by switching from one sensor to the adjacent one designated at setup.

In enhanced video surveillance systems, such as those disclosed by patent applications US2003/0085992 and WO2005/120071, this kind of configuration provides that, once an environment area has been selected through a monitor, the system will automatically recall the video signal of the video camera associated with that area.

However, all known surveillance systems suffer from the drawback that, should a sensor fail, the system will not be able to make up automatically for the absence of that sensor.

For example, during the execution of a tracking algorithm, the subject will be lost and the algorithm will stop as soon as the system switches to an out of order video camera.

Another problem suffered by known surveillance systems arises when two users of the system (e.g. two watchmen using two different monitoring stations) want to watch the same area of the monitored environment. Though the video signal can be sent to both monitoring stations, the control of the main video camera can only be granted to one user (who is typically chosen according to priority criteria). In this case, the second user must autonomously select another video camera and control it manually.

In large systems having multiple sensors and video cameras, searching for a video camera can be a complex task.

Another drawback of known surveillance systems is the complexity of the setup stage, wherein the installer must specify in the system which sensor is monitoring a certain area of the environment and which adjacent sensors are covering the border of the monitored area. An example of this procedure is known from patent application US2003/0085992, according to which for each scene taken by a video camera the installer must specify in the system the name of the shooting video camera and build a table by indicating which video camera is covering the northern border, which video camera is covering the southern border, and so on. Such a configuration is disadvantageous and difficult to implement in large systems comprising many sensors.

Aiming at overcoming this drawback, U.S. Pat. No. 6,437,819, has disclosed a setup procedure that does not require sensor names and adjacent sensors to be entered manually (which might lead to errors).

However, the setup procedure described in U.S. Pat. No. 6,437,819 has the drawback that it requires the presence of an installer who follows an appropriate path within the monitored area. This is disadvantageous wherever the area to be monitored is very wide (e.g. parking lots, airport terminals). Moreover, said procedure is not applicable to the case wherein some areas are not accessible to the installers, e.g. when updating old surveillance systems in prisons or plants that process dangerous substances.

The object of the present invention is to overcome the problems of known video surveillance systems.

In particular, it is the object of the present invention to improve the reliability of surveillance systems, in particular of video surveillance systems, by providing a dynamic adaptation of the system whenever a sensor cannot be used by the system.

This object is achieved through a surveillance method and a surveillance system incorporating the features set out in the appended claims, which are intended as an integral part of the present description.

The present invention is based on the idea of executing a setup stage focused on the environment, not the sensors.

In the setup stage according to the invention, the installer first creates a model of the environment by defining a plurality of areas of said environment, e.g. parking lot, main entrance, etc.

The installer then associates, with each area, at least one sensor in one or more of its possible positions (preset positions) and assigns an area monitoring judgment to each position.

The monitoring judgment preferably corresponds to an estimation of the probability of detecting an event occurring in the associated area by means of the sensor concerned, and in the operational stage it allows to carry out an intelligent selection of the sensors in order to monitor the environment. For video cameras, the monitoring judgment essentially corresponds to an area visibility judgment in the preset position taken into account.

During the operational stage, the control system of the surveillance system finds, among all the installed sensors, those sensors which can be used (e.g. those not out of order or not used by other users) in order to carry out the surveillance function.

Once the usable sensors have been verified, the control system controls one or more usable sensors by referring to the model created during the system setup stage and to the monitoring judgments assigned by the operator to the various preset positions of the sensors.

This allows for a dynamic association between the areas to be monitored and the sensors: if a sensor operating in the area of interest is not available (because it is out of order or already used by another user), that sensor will not be taken into consideration and the control system will select a second sensor in the configuration which is most suitable for monitoring the area of interest.

In addition, should a sensor fail, the system will reorganize the remaining sensors by positioning them in such a way as to optimize the possibility of detecting an event within the environment by using the available sensors. More specifically, this is made possible by the fact that the choice of the sensor is not only dependent on its association with the area of interest, but also on the monitoring judgments that, as aforesaid, are representative of the probability of detecting an event through the sensor.

In particular, said monitoring judgments can be used for selecting a sensor according to a heuristic methodology which, for example, assigns the available sensor having the highest monitoring judgment to a cell monitoring task.

These solutions allow to reduce the computational complexity of the algorithms used for managing the sensors.

Alternatively, the method according to the invention may provide for setting up the sensors so as to maximize the probability of detecting an event after defining an area to be monitored or constraints on the available sensors.

This allows to optimize the monitoring performance.

Furthermore, the surveillance system preferably has a distributed architecture with a plurality of computers communicating with one another over a network. A set of sensors is associated with each computer.

This (statistically) reduces the number of algorithms that each computer must execute simultaneously, e.g. in order to manage several tasks requested to different sensors which are managed by one computer.

In the preferred solution, the computers are integrated in the sensors, which thus become intelligent and capable of communicating with one another in order to automatically select their optimal configuration for the execution of the tasks requested by the operator.

Further objects and advantages will become more apparent from the following description and from the annexed drawings, which are supplied by way of non-limiting example, wherein.

ARCHITECTURE OF THE SURVEILLANCE SYSTEM

Figure 1:
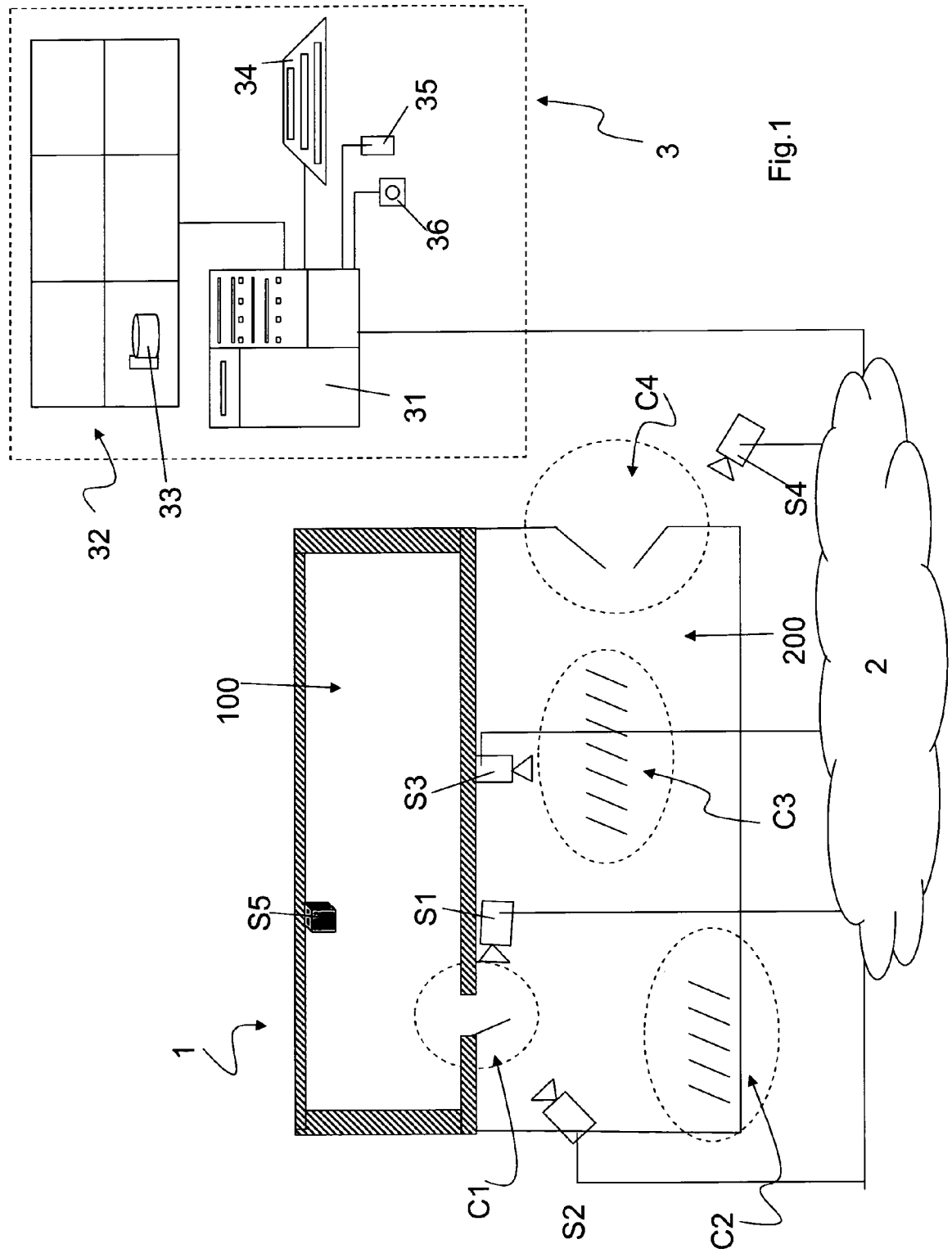
FIG. 1 shows a video surveillance system according to the present invention.

In FIG. 1, reference numeral 1 schematically designates an environment to be monitored. Environment 1 consists of a building 100 and an outdoor courtyard 200.

The following areas of particular interest are identified within the environment 1:
 an building entrance: area C1;
 a parking lot P1: area C2;
 a parking lot P2: area C3;
 an entrance gate: area C4;

The areas C1-C4 are monitored by four video cameras S1-S4 and one volumetric sensor S5 arranged within the environment to be monitored.

The number of areas into which the environment is divided and the number of sensors (video cameras and other sensors) are not limiting factors of the invention, but depend on the installer's choices.

Video cameras S1-S4 may be fixed or movable ones, in particular PTZ type (pan/tilt/zoom).

In the example of FIG. 1, video cameras S1 and S3 are fixed video cameras and only shoot respective areas C1 and C3, whereas video cameras S2 and S4 are PTZ video cameras capable or shooting areas C1-C2 and C3-C4, respectively.

Volumetric sensor S5 is a fixed one and sends an alarm signal when it detects motion inside building 100, e.g. because the door of entrance C1 is being opened.

The sensors are connected to a data network 2 through which they exchange signals with monitoring station 3, e.g. video cameras S1-S4 send the images taken.

Data network 2 may be a wired LAN, but of course said data network may also comprise wireless elements which may facilitate the installation of the video cameras.

Monitoring station 3 comprises a computer 31 which receives the images from the video cameras and displays them on suitable visualization means 32 adapted to display a plurality of images 33 simultaneously.

Said visualization means preferably comprise a plurality or screens or a single screen displaying several images next to one another (this solution is known as multiplexing).

Monitoring station 3 also comprises other per se known components, such as a keyboard 34, a mouse 35 and a joystick 36 used by the watchman for controlling PTZ video cameras by changing the pan, tilt and zoom angles thereof.

Like the visualization means, these components are also connected to computer 31, which is equipped with suitable interfaces, e.g. an interface for joystick 36, video interfaces for sending the images received from video cameras S1-S4 to visualization means 32, and a network interface through which the control data is sent to the video cameras.

This user interface, along with the keyboard, the joystick and the mouse, allows the user to select and control the video cameras, thus activating the transfer of an image from one or more video cameras to visualization means 32.

When any of areas C1-C4. e.g. parking lot P2, is selected, an image is transferred from a video camera, e.g. S2, which is automatically associated with the selected area according to a predetermined criterion aiming, as described below, at maximizing the probability of detecting an anomalous event within an area of interest.

The details of the interface that allows the video cameras to be recalled will be described later on in a dedicated section.

In the example of FIG. 1, the architecture of the system is of the centralized type, with a single computer 31 executing the calculation algorithm required for controlling the sensors and performing surveillance functions such as tracking subjects moving within the environment, recording video portions, and automatic event detection. Other solutions are still possible as well: for example, the surveillance system may be provided in the form of a distributed system like the one described later on in the section entitled "Variant with a control system having a distributed architecture".
System Setup According to the invention, during the surveillance system setup stage a model of the environment is created by defining the areas of interest C1-C4 of the environment and the adjacencies thereof.

In the following description, the areas of said model will be called 'cells' in order to avoid any confusion with the physical areas of the environment.

Subsequently, each cell C1-C4 is associated with one or more sensors capable of monitoring at least a portion of the area corresponding to that cell.

In particular, since PTZ video cameras can take a plurality of positions, each cell is associated not only with a video camera, but with a video camera in a given position (called 'preset').

Of course, for fixed video cameras or sensors there is only one predetermined position which is set when the sensor is installed.

During the setup stage, the sensors are activated sequentially.

For each mobile video camera or sensor, the operator defines the preset positions of the mobile sensor which best meet the operator's surveillance needs.

For each preset position, the operators associates the sensor with an area of the environment through selection means, and assigns a monitoring, judgment (e.g. expressed as a value between 0 and 1) representing the quality of the image taken.

The monitoring judgment corresponds to an estimation of the probability of detecting through said sensor an event occurring within the cell with which the sensor in a certain preset position has been associated.

In the operational stage, this allows to control the sensors by positioning them in those preset positions that maximize the probability of monitoring the environment.

The examples of FIGS. 2a-2c and 3a-3b illustrate two different environment models, which are used by the user interface for showing the environment to be monitored to the installer and for allowing him to select an area.

Figure 2A:
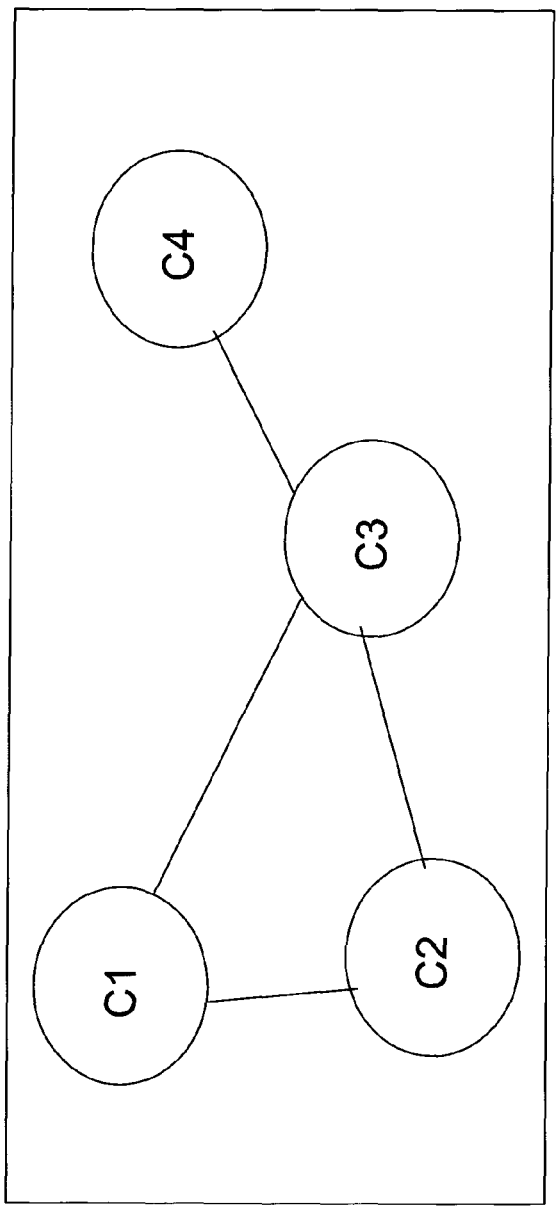
FIGS. 2a, 2b and 2c show an environment model used by the system for activating the video cameras.
Figure 2B:
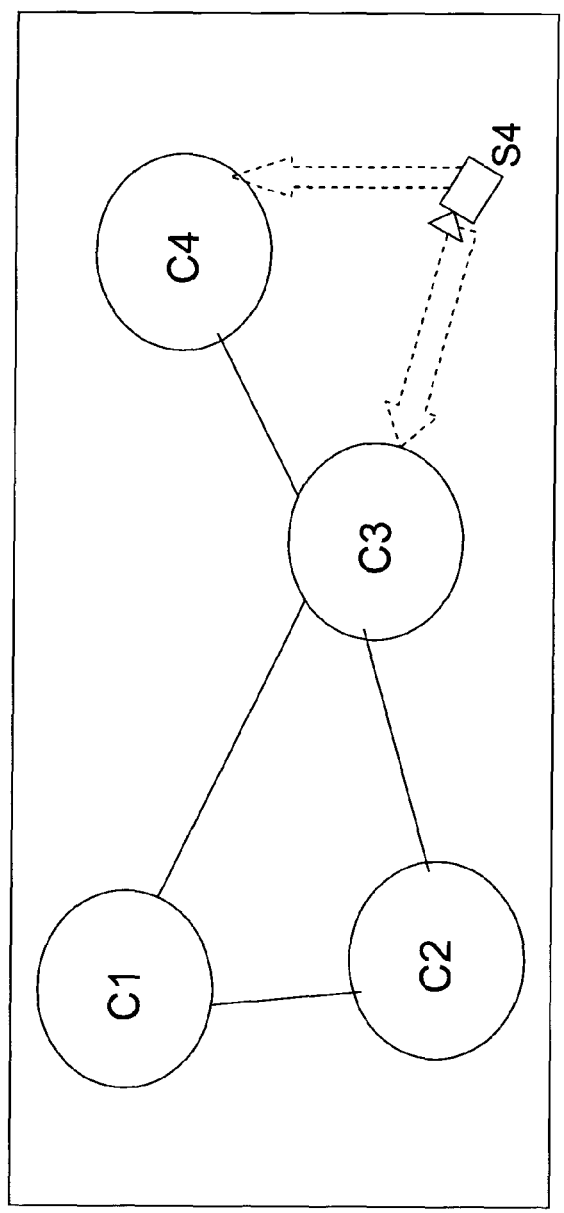
Figure 2C:
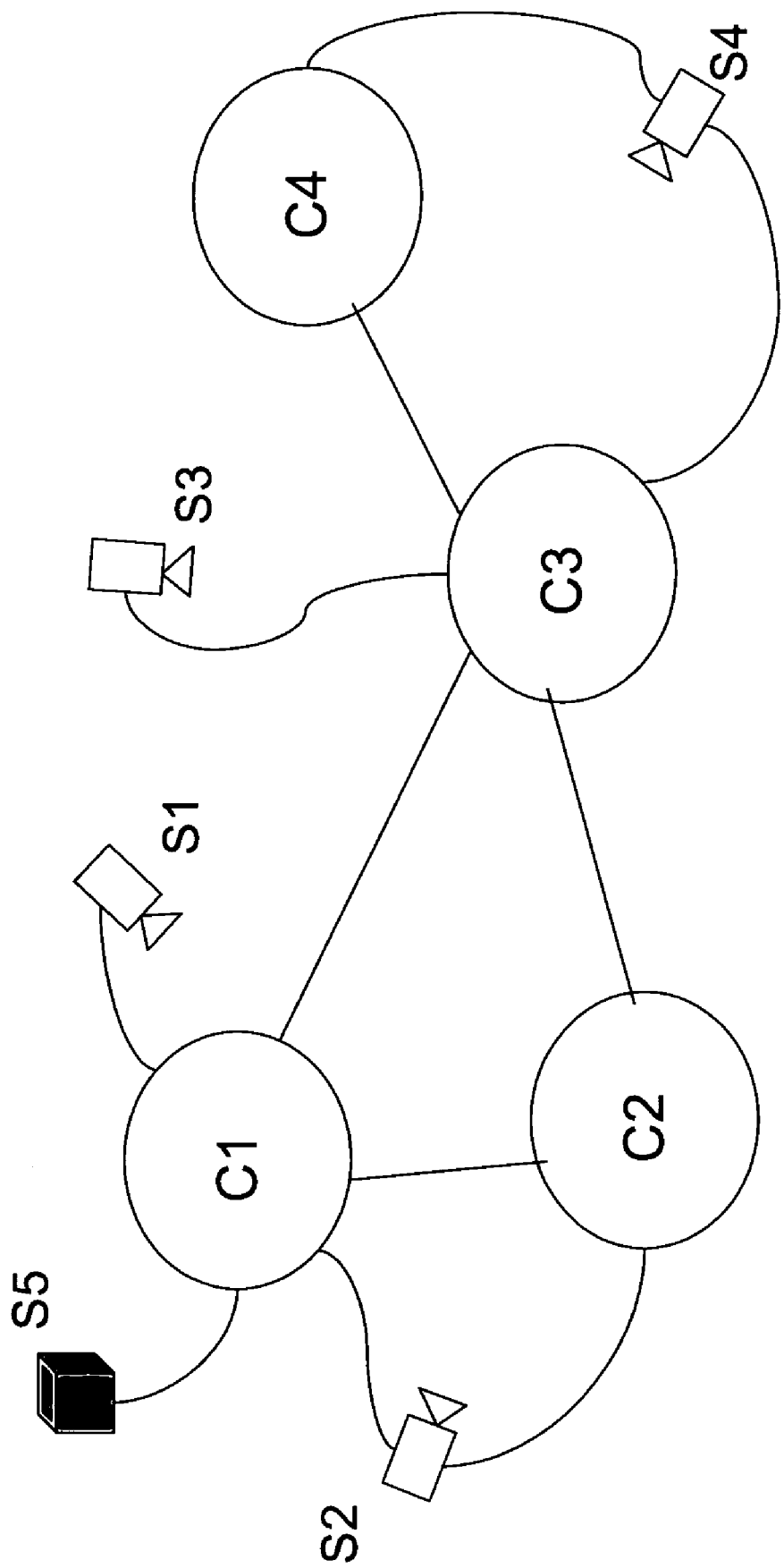

With reference to the example of FIGS. 2a, 2b and 2c, the program providing the user interface allows to define a list of cells and the connections thereof through a graphic interface that allows to draw a graph in which the cells are represented as nodes connected by arches.

Advantageously, the spatial arrangement of the nodes is free, so that during the setup stage the operator can arrange them in such a manner as to reflect the geographical arrangement of the areas to be monitored, thus allowing the watchman to immediately find the area to be monitored during the operational stage.

According to an alternative solution which is less complex from a computational viewpoint but slightly less user-friendly, the definition of the areas and connections thereof can be done in text mode.

Referring back to the example of FIGS. 2a-2c, in the setup stage the operator creates the environment model and then activates the sensors sequentially (e.g. cycles the video cameras). For each sensor, the operator verifies the monitored area (e.g. he sees the image taken by a video camera on the screen) and creates a connection with the model areas while assigning a monitoring judgment.

The sensor/area connections may be provided by drawing a link between the icon representing the sensor and the block representing the framed area.

In this manner, a cell/sensor graph is created like the one shown in FIG. 2c.

The preset of the sensor and the monitoring judgment are stored into a database of the control system by the software.

Figure 3A:
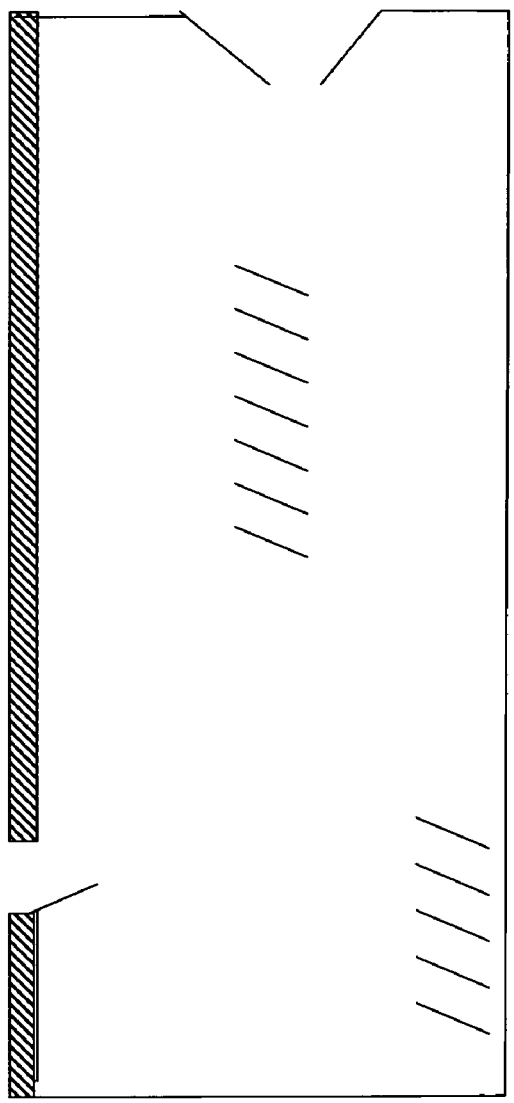
FIGS. 3a and 3b show an environment model used by the system for activating the video cameras.
Figure 3B:
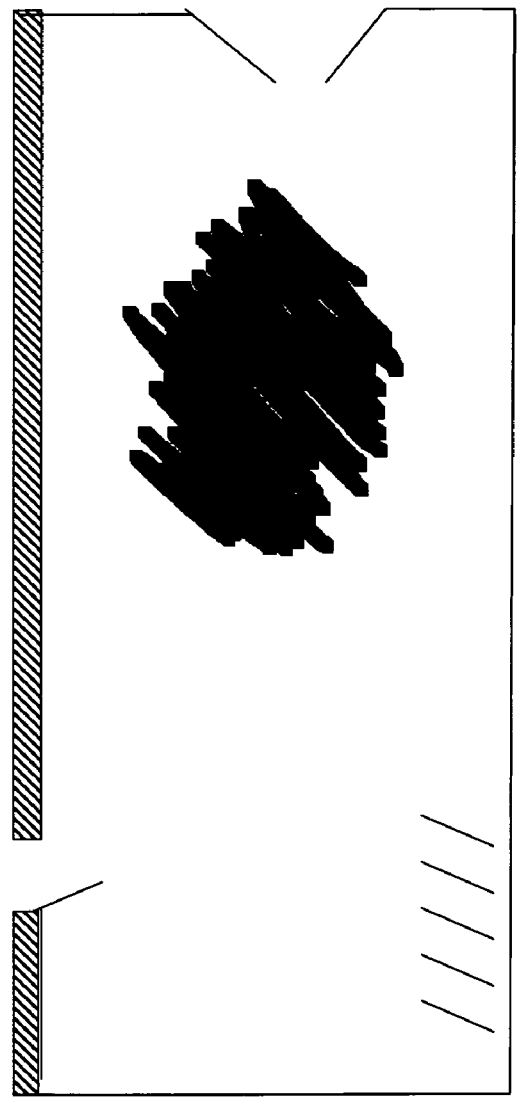

In the example of FIGS. 3a-3b, the environment model consists of a map of the area to be monitored.

The map, shown in FIG. 3a, may be built electronically by the operator by using common graphic programs, or it may be an imported graphic file.

In the solution of FIGS. 3a-3b, during the setup stage the operator selects a sensor and, for each preset position, marks the monitored area on the map, as shown in FIG. 3b, and associates a monitoring judgment, e.g. by typing a value on keyboard 34 or by selecting a displayed value with mouse 35.

When a group of pixels corresponding to the area monitored by the sensor is selected, the software will automatically create the model cells and the respective adjacencies.

In an embodiment of the invention, each pixel selection corresponds to one cell or the model.

Neighbouring pixel groups are adjacent cells.

In a preferred embodiment, pixel groups overlapping each other to a sufficient extent are grouped into a single cell.

The criterion used for deciding whether two pixel groups should be grouped together into a single cell or not is defined during the programming stage: if two pixel groups just touch, it may in fact be preferable to keep the two cells separated.

The geometrical information associated with each cell (area, shape) and the information about the direction of transit between the cell are extracted automatically.

Barriers may be included in the map which will be taken into account when calculating adjacencies: for example, two non-communicating rooms are not adjacent to each other.

Other information (cell labels, area mobility, time-dependent barriers, arch orientation, etc.) may be added by the user once the model has been built.

When setup is over, the control system will draw a cell/sensor graph like the one shown in FIG. 2c.

Algorithm for Optimal Coverage

After the setup stage, the control system is ready to start the operational stage of environment surveillance.

Given an area of interest and a set or sensors, the goal is to monitor said area by selecting the most suitable sensors and by controlling them in the most appropriate manner.

This translates into maximizing the probability of detecting an anomalous event occurring within a given area of interest.

In particular, it is assumed that the area of interest is a set of N cells of the environment model built during the setup stage.

$C_i$ designates the anomalous event occurring in cell i.

The surveillance system comprises M sensors, $x_j$ designating the position of sensor j.

In particular, for PTZ (Pan Tilt Zoom) sensors, the position may take values within a finite discrete set of values called 'preset'.

A fixed sensor may be treated like a particular PTZ sensor with only one preset.

In general, the position of a sensor may take values within a continuous domain and may comprise geographical coordinates for sensors located on mobile means (patrol car, robot, etc.).

The detection of an event being designated D, the expression $$p(D|C_1 \cup C_2 \cup \ldots \cup C_N, x_1, \ldots, x_M) \qquad (1)$$

indicates the probability of detection or an anomalous event on condition that the event occurs in only one of N cells associated with the environment portion to be monitored and that M sensors are in certain preset $x_j$.

The problem of the optimal coverage of a given area therefore translates into finding the optimal sensor configuration that will maximize said probability. Said configuration may be expressed as:

$$\hat{x}_1, \hat{x}_2, \ldots, \hat{x}_M = \underset{x_1, \ldots, x_M}{\operatorname{argmax}}\, p(D|C_1 \cup C_2 \cup \ldots \cup C_N, x_1, \ldots, x_M) \qquad (2)$$

The detection probability may be expressed as:

$$p(D|C_1 \cup C_2 \cup \ldots \cup C_N, x_1, \ldots, x_M) = \frac{\sum_{i=1}^{N} p(D|C_i, x_1, \ldots, x_M) \cdot p(C_i)}{\sum_{i=1}^{N} p(C_i)} \qquad (3)$$

The above expression is obtained by exploiting the immediate observation that the occurrence of an event in cell i is independent of the position of M sensors, i.e. $p(C_1|x_1, \ldots,$ $x_M) = p(C_1)$. The probability $p(C_1)$ that the event occurs in a given cell i can be proportional to the size of the corresponding area and to the criticality that characterizes the cell from the surveillance point of view.

For simplicity's sake, it will be assumed below that all the areas of the model have the same probabilities; the detection probability expression will thus become:

$$p(D | C_1 \cup C_2 \cup \ldots \cup C_N, x_1, \ldots, x_M) = \frac{\sum_{i=1}^{N} p(D | C_i, x_1, \ldots, x_M)}{N} \quad (4)$$

Where $p(D|C_1, x_1, \ldots, x_M)$ is the detection probability or an event, the latter occurring in cell i and the sensors being in certain preset $x_j$.

Now let us consider the case wherein a given cell is watched by a single sensor of the surveillance system. e.g. sensor 1.

It is thus obtained that $p(D|C_1, x_1, \ldots, X_M) = p(D|C_1, x_1)$, i.e. the detection in cell i does not depend on the position of those sensors that are not monitoring cell i.

$p(D|C_1, x_1)$ is assumed to be the monitoring judgment assigned by the installer when setting up the surveillance system. In more detail, said monitoring judgment is the one that was assigned to sensor 1 in position $x_1$ when it was associated with cell i.

Quite reasonably, if the monitoring judgment is high, then the probability of detecting an event in the given area of the model will be high as well. Vice versa, if the judgment were zero, it would be impossible (null probability) to attain a detection in the given cell with sensor 1 in the preset $x_1$.

Let us now consider the case wherein a cell 1 is watched by multiple sensors in appropriate preset.

Aiming at helping the installer, the above-described setup procedure does not provide combined monitoring information.

For this reason, in the absence of such information the worst case will be taken into account: the sensor having the highest visibility is found and it is assumed that the other sensors cannot add any information which may increase the visibility of the given area of the model. It is thus obtained that:

$$p(D | C_i, x_1, \ldots x_M) = \max_{j=1,\ldots,M} p(D | C_i \cdot x_j) \quad (5)$$

Let us now consider the following example. Two sensors s1 and s2 positioned in $x_1$ and $x_2$ see a given cell $C_1$ with visibility judgments 0.8 and 0.6, respectively.

It is assumed that the other sensors do not see the given cell in any preset, or that they are positioned in presets where they cannot see the given cell.

It is thus obtained that $p(D|C_1 x_1) = 0.8$, $p(D|C_1, x_2) = 0.6$, $p(D|C_1, x_1) = 0$ $j > 2$ and that, from the previous expression, $p(D|C_1, x_1, x_2, \ldots, x_M) = 0.8$.

By developing (4) based on this assumption, it will thus be obtained that:

$$p(D | C_1 \cup C_2 \cup \ldots \cup C_N, x_1, \ldots, x_M) = \frac{\sum_{i=1}^{N} \max_{j=1,\ldots,M} p(D | C_i, x_j)}{N} \quad (6)$$

where $p(D|C_1 x_1)$ is the monitoring judgment with which the sensor j in the preset $x_1$ is monitoring the cell $C_1$. The above expression quantities in a rigorous manner the quality of the coverage of a given area, thus allowing to compare different configurations of sensors used for that purpose.

The optimal configuration $\hat{x}_1, \hat{x}_2, \ldots, \hat{x}_M$ can be searched for among all possible configurations as explained below.

The algorithm that allows the optimal configuration to be found starts from the information contained in the cell/sensor graph (FIG. 2c) drawn when setting up the surveillance system.

For each cell there are one or more arches that tie the cell to the sensors that monitor it.

For each arch there is a piece of information indicating the sensor preset. By taking into account all the cells of the area to be covered, it is possible to build the set of sensors to be used for obtaining said coverage, with the respective presets.

The optimal sensor configuration $\hat{x}_1, \hat{x}_2, \ldots, \hat{x}_M$ is the one which maximizes the detection probability; hence, in a preferred solution the algorithm proceeds by calculating (6) for every sensor combination, and then chooses the sensor combination having the highest detection probability.

This will become apparent from the following example: given three cells $C_1$, $C_2 e C_3$: cell $C_1$ is seen by sensor 1 in preset $x_1^1$, cell $C_2$ is seen by sensor 2 in preset $x_2^1$ and in preset $x_2^2$, and cell $C_3$ is seen by sensor 2 in preset $x_3^2$.

The range of possible configurations consists of the pairs $(x_1^1, x_2^1)$ and $(x_1^1, x_2^2)$.

Of course, a configuration like $(x_1^1, x_2^1, x_2^2)$ is not acceptable because at any instant of time a given sensor can only be in one position.

Once the two possible configurations have been determined, the algorithm calculates the detection probabilities corresponding to said two configurations.

Let us now assume that all monitoring judgments are equal to 1, except the one of preset $x_2^2$, which is 0.8 (this preset sees 2 cells, but with inferior quality).

In these conditions, the first configuration $(x_1^1, x_2^1)$ has a probability of detecting an anomalous event occurring within the environment which is equal to $$p(D | C_1 \cup C_2 \cup C_3, x_1^1, x_2^1) = \frac{2}{3}$$

Whereas the second configuration $(x_1^1, x_2^2)$ has a probability of detecting an anomalous event occurring within the environment which is equal to $$p(D | C_1 \cup C_2 \cup C_3, x_1^1, x_2^2) = \frac{2.6}{3}$$

The algorithm then compares the two calculated detection probabilities and chooses the configuration $(x_1^1, x_2^2)$, i.e. the one that maximizes the probability of detecting an event in a given area, which in this case corresponds to the entire environment.

It is apparent from the above description that if the number of possible configurations is large, searching for the optimal configuration may be a heavy computational task.

In such a case, operational research methods may be applied in order to obtain a sub-optimal solution.

These methods, although based on the monitoring judgments and on the cell/sensor graph, minimize a suitable cost function obtained from the detection probability.

Alternatively, the computational complexity may also be reduced by introducing heuristic methodologies; for example, one may choose to set every sensor to the position that has the highest monitoring judgment, so as to monitor one or more cells which are seen only by that sensor.

Once established, these heuristic methodologies are independent of the calculation of the detection probability, even though ibis probability may be used for comparing the performance or the different heuristic methodologies when designing the algorithm: if several heuristic methodologies are proposed, the calculation of the detection probability will allow to establish which configuration among those proposed by the heuristic methodologies is most appropriate for detecting events.

Optimal Coverage with the Lowest Number of Sensors

The optimal coverage problem discussed in the previous section can be supplemented by the constraint of having to use the lowest possible number of sensors.

The algorithm for calculating the optimal coverage with the lowest number of sensors is also based on the assumption that the probability of detecting an event in a cell does not increase with the number of sensors used for covering that cell. It is thus assumed that:

$$p(D \mid C_i, x_1, \ldots, x_M) = \max_{j=1,\ldots,M} p(D \mid C_i, x_j) \qquad (7)$$

Therefore, the algorithm only considers the sensor having the highest monitoring judgment among all those sensors that see the same cell.

Sensors having a lower judgment are considered to be redundant. Although from a practical point of view it may be useful to add information from more sensors (e.g. to add frames of an area) in order to improve the monitoring performance to some extent, there are nonetheless situations where it is important that no redundant information is received: an operator receiving redundant information will evaluate what is happening in the monitored scene more slowly and with more difficulty.

Not less important, the use of the minimum number of resources in a multi-user and multi-tasking system will increase the possibility of serving more operators and tasks simultaneously.

The optimal solution in the presence of the aforementioned constraint is found by considering all the possible subsets of the global set of sensors to be used for optimal coverage.

For each subset, the optimal preset configuration is found as described in the previous section "Algorithm for optimal coverage".

The solution to the current problem is represented by the minimum cardinality set having the highest detection probability.

It should be remarked that it is not necessary to take into consideration all the possible sensor subsets: when the detection probability of the optimal solution searched for in the sensor subsets having N cardinality is equal to the optimal detection probability searched for in the subsets having N−1 cardinality, then the optimal solution will be a configuration with N−1 sensors.

Therefore, the method advantageously provides for searching the solution to the optimal coverage problem in increasing cardinality sensor subsets.

Time-Variant Optimal Coverage

Let us now consider a situation in which the optimal solution cannot provide coverage of the whole environment, e.g. because the number of available sensors is rather small.

In order to monitor the whole environment, a task called 'patrol' is carried out which comprises the following steps.

First of all, the configuration that maximizes the probability of detecting an event occurring within the environment is calculated; this is obtained through the optimal coverage algorithm discussed above in the section so entitled.

Through the effect of said algorithm, the sensors position themselves in such a manner as to monitor a number X of cells which is smaller than the total number of cells (which is assumed to be a number N).

This configuration is maintained for a predetermined time, after which the optimal coverage algorithm is applied to the N−X cells that were not monitored by the sensors of the previously calculated configuration.

The new sensor configuration is maintained for a predetermined time, which is preferably set by the operator.

If the new configuration does not cover all the cells, then the method will apply again the optimal coverage algorithm to the remaining cells and will maintain the new configuration for a predetermined time.

The procedure is repeated until all cells are covered.

It is possible that, when maximizing the probability of detecting an event in a progressively decreasing number of cells, configurations are found which include redundant sensors; it is for this reason that it may be advantageous to use the optimal coverage algorithm under the constraint that the lowest number of sensors should be used.

In this manner, any sensors which are redundant in the coverage of the selected cells will be used for covering cells already seen at previous steps, so as to maximize the probability of detection within the environment. As will be explained in detail below, in traditional video surveillance systems the patrol function utilizes independent sensors cycling in their respective presets and not co-operating together to covering the monitored area.

Optimal Border Coverage

Surveillance systems provide a function called 'target tracking', i.e. tracking a moving target within the monitored environment.

The cell occupied by the target is called 'active cell', while adjacent cells are called 'border cells'.

The adjacencies between the cells are defined in the cell/sensor graph drawn at system setup.

In order to not lose the target, while a sensor is positioned on the active cell the other sensors are so configured as to provide optimal coverage of the border area.

The purpose of the optimal border coverage algorithm is to maximize the following probability:

$$p(D \mid \overline{C}_1, C_1 \cup C_2 \cup \ldots \cup C_N, x_1, \ldots, x_M) \qquad (8)$$

Said probability corresponds to the probability of detecting an event on condition that the event comes from the cell k and occurs in one of N border cells $C_1$ of cell k, and that M sensors are in certain positions $x_1$.

Under conditions similar to those described for the optimal coverage calculation, the detection probability is given by the following relationship:

$$p(D \mid \overline{C}_k, C_1 \cup C_2 \cup \ldots \cup C_N, x_1, \ldots, x_M) = \quad (9)$$

$$\frac{\sum_{i=1}^{N} \max_{j=1,\ldots,M} p(D \mid C_i, x_j) \cdot p(C_i \mid \overline{C}_k)}{\sum_{i=1}^{N} p(C_i \mid \overline{C}_k)}$$

where $p(D|C_1, x_1)$ is the monitoring judgment of sensor j in preset $x_1$ watching cell $C_1$, while $p(C_1|\overline{C}_k)$ is probability that the target moves from the active cell to the presumably existing border cell i.

According to a preferred embodiment, when creating the environment model during the setup stage it is necessary to specify the probabilities of transition from one cell to another. These probabilities correspond to the $p(C_1|\overline{C}_k)$ instances in the above formula. If the information about the probability of transition from one cell to an adjacent one is not specified, as in the embodiment example described with reference to FIGS. 2a-2c and 3a-3b, then all $p(C_1|C_k)$ instances are equal and the relationship for the calculation of the probability of detecting the event in the border cell will be given by:

$$p(D \mid \overline{C}_k, C_1 \cup C_2 \cup \ldots \cup C_N, x_1, \ldots, x_M) = \quad (10)$$

$$\frac{\sum_{i=1}^{N} \max_{j=1,\ldots,M} p(D \mid C_i, x_j)}{N}$$

Finally, since border coverage is a particular optimal coverage problem, it can also be tackled by using time-variant coverage methodologies similar to the one described in section "Time-variant optimal coverage".

Dynamic Sensor Co-Operation and Reconfiguration

In a given surveillance system, the set of sensors that can participate in a task for providing optimal coverage of a given area will change over time due to the different priorities of the tasks to be carried out and of the various operators requesting them.

By way of example, it is possible that, while the system is performing a 'patrol' function for checking the environment, an operator requests the control of a video camera: if the operator has priority over the automated patrol procedure, it is clear that said procedure will have to be carried out without the video camera controlled by the operator.

Furthermore, any sensors out of order will change the set of available sensors over time.

In order to cope with these situations, the system calculates the optimal configuration for covering a given area every time the set of sensors participating in the coverage changes.

For example, when the number of video cameras that can be used for a task decreases, the remaining video cameras covering the given area will be controlled in such a manner as to provide wider zoom frames, or according to a time-variant coverage procedure (as described above) which will change the framing over time so as to cover all cells.

In this latter case, the time of permanence of the sensors in a given configuration can be reduced in order to ensure adequate coverage.

Vice versa, if the number of sensors increases, the sensor configurations used will be aimed at covering smaller areas, e.g. video cameras with higher zoom levels, with an increase in the time of permanence of each sensor in a certain preset.

The surveillance method according to the invention thus allows the sensors to be reconfigured dynamically.

The control system of the surveillance system, whether a centralized one (as in FIG. 1) or a distributed one (as described below in section "Variant with a control system having a distributed architecture"), verifies which sensors are available and decides which task they must participate in.

For example, when an event is being tracked, once the target has been found in the active cell the sensors that monitor the border are configured in such a manner as to provide the best border coverage. These sensors are then controlled according to an optimal border coverage algorithm.

The remaining sensors are dedicated to the optimal coverage task for the remaining cells, and are thus so configured as to maximize the probability of detecting an event in the remaining cells.

Dynamic sensor configuration is made possible by the fact that the coverage problem is formulated as a function of the environment and of the cell/sensor graph, not of sensor adjacencies.

This approach brings some degrees of freedom in the choice of the sensors, in that an area can be covered in different ways by using sensors in different configurations.

These degrees of freedom allow to manage those situations wherein the sensors participating in the coverage task may vary.

Border coverage is a broader form of co-operation which, in addition to co-operation aimed at attaining optimal border coverage, also provides co-operation between the active sensor and the border sensors. As the active sensor or the position of a given active sensor changes, the border will change as well along with the sensors coveting it and the configuration thereof. This functionality is called 'assisted navigation' and will be described in detail in the next section.

Assisted Navigation

The surveillance system according to the invention performs a function called 'assisted navigation', which provides a simple and effective tracking of moving targets within the environment.

Tracking the movements of a target (target tracking) is a difficult task and, as known, poses a number of problems related to the selection of the active camera (the one that is framing the target) and to the switching from the active camera to another camera to be activated in order to continue tracking the target.

The assisted navigation function is the solution to said problems.

One an event has been detected (automatically or by the operator), the operator selects the camera shooting the event and turns on the navigation function.

The assisted navigation algorithm detects the sensor chosen by the operator (active sensor), thereby identifying it and obtaining its positioning data (orientation in space).

Through the cell/sensor graph drawn during the setup stage, the navigation algorithm determines the environment portion currently monitored by the active sensor (active region) by calculating the set of cells that form the active region.

When the sensor that is monitoring the active cell is controlled manually by the operator, as is the case of a PTZ sensor, the latter may be in a position other than the preset positions recorded at setup; this is due to the fact that the PTZ sensor can spilt among a substantially continuous set of positions, whereas the method according to the invention requires that a discrete number of positions be recorded (at setup).

Based on suitable metrics, the algorithm estimates the preset position which is closest to the position set by the operator.

Starting from the preset position thus calculated, the algorithm then obtains the border of the active region, i.e. the set of cells not belonging to the active region but adjacent thereto.

The calculation of the active cells and of the border is dynamic: therefore, if the active sensor changes its position, the assisted navigation algorithm will repeat the calculation and update the border accordingly.

By using the optimal border coverage algorithm, the assisted navigation algorithm chooses the most suitable sensors and positions them in a manner such that the monitoring of the border of the active region is maximized. Among all sensors in the system, this procedure selects only those sensors which can potentially detect the target should the latter exit the active region, i.e. the range of the active sensor.

If the sensors are video cameras, the assisted navigation functionality provides for simultaneously displaying the view of the active camera and the views of the cameras that are monitoring the border (adjacent cameras).

When the target exits the visibility range of the active camera, if the border is wholly monitored it will appear in one of the views of the adjacent cameras. Finding the target in one of the adjacent views is an easy task for an operator, who can thus easily locate the new active video camera and possibly take control of it.

Advantageously, the images taken by the video cameras are displayed on a touch screen.

In this embodiment, by touching the view containing the target the operator generates a signal that is used by the assisted navigation algorithm for identifying, the video camera which is responsible for the selected view and, with the help of said information, for executing the above-described algorithm steps.

If the border is not completely monitored, the probability or losing the target is minimized by using for a task of the optimal coverage of the remaining cells those sensors not employed by the navigation task.

Sequence Per Area

Another function provided by the surveillance system according to the present invention is called "sequence per area".

This function allows to overcome the drawbacks of known sequences, which show the images taken by the system video cameras one at a time according to a sequence defined by an operator at setup.

The method according to the invention requires that during the setup stage the operator selects the area to be monitored by sequence.

The selection of the area can be done by highlighting a portion of an electronic map or by specifying a set of cells forming the area of interest.

At this stage, the operator only has to specify the area to be monitored, the length of the views and, optionally, the coverage direction.

Preferably the operator will not provide any indications about the sensors to be used for creating the sequence; however, the operator may set constraints to the choice of one or more sensors.

Based on this information, the method executes the optimal coverage algorithm under the constraint that only video cameras should be used and, preferably, also under the constraint that the lowest number of video cameras should be used, thereby finding a camera configuration that will cover the area specified by the operator.

As discussed above, the optimal coverage algorithm takes into account the priorities and availability of the sensors: if a sensor is busy performing another task, the algorithm will make the calculations by considering only the available sensors.

The sensor calculation is dynamic and depends on the activities for which the sensors are used.

After selecting the set of sensors that will participate in the sequence, it is necessary to define the time order of the sequence of images to be displayed.

In an embodiment of the invention, the operator specifics a shooting order for the cells associated with the area to be monitored by the sequence.

In the preferred embodiment, the sequence by area algorithm executes a final calculation step to determine the time order according to which the sensors will be activated.

This final calculation is made by using the information about the positions of the sensors contained in the cell/sensor graph.

Preferably, the algorithm provides spatial continuity of the different views, so that sensors shooting adjacent cells will be contiguous in the sequence.

The above-described sequence per area method allows the sequence of the sensors involved in the sequence per area to be calculated automatically, thus allowing to overcome the efficiency limits of sequences set manually by the operator.

Furthermore, the above described sequence per area method provides dynamic sensor selection, so that it is possible to carry out a sub-optimal sequence that covers the area of interest even in the presence of conflicts caused by a multi-user and multi-tasking environment, e.g. two users or tasks requesting the same sensor simultaneously.

User Interface

The invention uses an advanced interface that allows the operator to monitor the entire environment quickly and effectively.

The interface shows the operator a model of the environment in the form of a cell/sensor graph (FIG. 2c) or an electronic map.

This allows the operator to recall the images of an area simply by selecting the corresponding cell in the cell/sensor graph or by pointing at it with the mouse or touching it (if a touch screen is used) on the electronic map.

This provides fast surveillance because the watchman can quickly and intuitively concentrate on the image of the area of interest.

The user's selection is read by the interface and sent to the control system, which then recalls the images (or, generally speaking, the information) of one or more sensors that are monitoring the selected area.

The sensors are selected according to the selected area and to the operator's preferences, who may, for example, decide to display a single frame of the area or to execute an optimal coverage of the area.

These preferences may be set, for example, through a drop-down menu which can be opened by clicking with the right mouse button on the area of interest.

Variant with a Control System Having a Distributed Architecture

The above-described surveillance system and method allow for multi-user and multi-tasking, monitoring.

It is therefore possible that at a given time instant multiple tasks tire requested, such as optimal coverage of different environment areas, or that the above-described navigation kind sequence per area functions are activated.

It is thus apparent that the computational power of the system must be sufficient to withstand the computational complexity deriving from the simultaneous activation of multiple algorithms.

In large surveillance systems with many sensors, such computational complexity may not be easily handled by a control system having a centralized architecture like the one shown in FIG. 1.

In an advantageous embodiment, the control system that executes the algorithms of the various tasks is a distributed one, i.e. it consists of a plurality of computers communicating with one another over a data network.

The large number of computers also ensures a good level of redundancy in the event of any failures.

The computers are preferably located in different and distant places in order to ensure a higher level or security against any attacks aimed at the physical destruction thereof.

According to this embodiment, the environment model and the cell/sensor graph drawn during the setup stage are stored in all computers, so that each computer can execute the above-described coverage algorithms autonomously.

Each computer is associated with a subset of sensors (preferably just one) and is therefore related, through the cell/sensor graph, to as subset of areas within the monitored environment.

A computer participates in a task (e.g. a sequence per area or navigation task) concerning a given area if one of the sensors managed by that computer sees at least one cell of the area in at least one of its presets.

The computer also decides if one of its sensors must participate in a task depending on the priorities of the different tasks requested. For example, if a sequence per area is requested and the sensor involved is already used for a navigation task, the computer may decide not to participate in the new task because navigation has higher priority than the sequence per area.

Once the participation in a certain task has been decided, a computer needs to known which other sensors will also participate in that task in order to calculate the optimal coverage.

This is made possible by the fact that each computer sends to all the other computers, over the data network, a piece of information indicating the tasks in which its sensors are participating. Each computer thus knows the complete set of sensors participating in the task, and can therefore calculate the configuration of the controlled sensors in order to obtain the optimal coverage.

Each computer is dimensioned for executing, at least one optimal coverage algorithm for the whole environment.

However, the number of tasks in which a computer is simultaneously involved is reduced as the number of sensors associated therewith decreases: it follows that the computational power of every single computer belonging to a distributed system can be reduced compared with that required by a centralized control system.

The optimal solution, therefore, would be to use one computer per sensor or, better still, to integrate the computers into the sensors, thus making the latter intelligent.

Other Variants of the Surveillance System

The advantages of the video surveillance system are apparent from the above description, while it is also clear that many changes may be made thereto, e.g. by concentrating or distributing the control system resources or by using equivalent procedures for managing the same information required and processed by the above-described surveillance methods.

For example, the cell/sensor graph drawn at the end of the setup stage has been proposed because it allows the operator to read the cell/sensor relationships very easily. However, for strictly numerical processing purposes the cell/sensor graph may be replaced with a cell/sensor table containing the same information about the relationships between cells and sensors.

The invention claimed is:

1. Method for monitoring an environment through a plurality of sensors, wherein a control system receives information from one or more sensors of said plurality and uses said information in order to monitor said environment comprising a setup stage wherein an operator of said control system:
    creates a model of the environment by defining a plurality of cells corresponding to areas of said environment,
    creates cell/sensor relationships between said plurality of cells and said plurality of sensors, by defining for each sensor of said plurality at least one possible position and associating said at least one possible position with at least one cell of said plurality, and
    assigns to each possible position thus defined a monitoring judgment for the associated cell,
and comprising an operational stage wherein, in order to carry out a surveillance function on an area to be monitored, said control system:
    finds the sensors which can be used for carrying out said surveillance function among said plurality, and
    controls at least one of said usable sensors by positioning it in a possible position selected on the basis of said cell/sensor relationships and of the monitoring judgments associated with the possible positions of said plurality of sensors.

2. Method according to claim 1, wherein said monitoring judgment corresponds to an estimation of the probability of detecting an event occurring in the associated cell.

3. Method according to claim 1, wherein said plurality of sensors comprises at least one video camera, and wherein a monitoring judgment assigned to at least one position of said video camera corresponds to a judgment of visibility of the associated cell.

4. Method according to claim 1, wherein when creating said model of the environment said operator specifies in the control system the adjacencies among said cells.

5. Method according to claim 4, wherein said operator specifies a shooting order for the cells associated with said area to be monitored, and wherein said sequence of images is determined by said shooting order, and wherein said sequence of images follows an order which depends on the adjacencies among the cells associated with said area to be monitored.

6. Method according to claim 4, wherein said control system controls a group of sensors of said plurality of usable sensors by positioning them in respective possible positions according to a configuration chosen among the various possible combinations of the possible positions of said group of sensors, and wherein an event is detected in an active cell, and wherein said area to be monitored corresponds to the border of said cell.

7. Method according to claim 6, wherein said operator specifies in the control system an environment area where said event is detected and wherein said control system locates said active cell.

8. Method according to claim 7, wherein said environment area in which said event is detected corresponds to the environment portion taken by a video camera selected by said operator.

9. Method according to claim 8, wherein said selected video camera is a mobile video camera, and wherein said operator controls said mobile video camera.

10. Method according to claim 9, wherein said control system determines said configuration by considering that said mobile video camera is in a possible position defined by said operator.

11. Method according to claim 10, wherein said possible position taken into consideration is determined by comparing said at least one possible position of said mobile video camera with the position of said mobile video camera when said surveillance function is executed.

12. Method according to claim 6, wherein said configuration is determined under the constraint that video cameras only should be used, and wherein said method also comprising the operations of displaying the images taken by the video cameras controlled by said control system for performing said surveillance function.

13. Method according to claim 12, wherein said displayed images are displayed near an image taken by said selected video camera.

14. Method according to claim 13, wherein said displayed images and said image taken by said selected video camera are displayed on a touch screen.

15. Method according to claim 14, wherein said operator activates a surveillance function by touching an area of said touch screen.

16. Method according to claim 1, wherein said selected possible position maximizes a probability of detecting an event in said area to be monitored.

17. Method according to claim 1, wherein said control system controls a group of sensors of said plurality of usable sensors by positioning them in respective possible positions according to a configuration chosen among the various possible combinations of the possible positions of said group of sensors.

18. Method according to claim 17, wherein said configuration maximizes the probability of detecting an event in said area to be monitored.

19. Method according to claim 18, wherein said probability is constrained to the use of the lowest number of sensors required for performing said surveillance function.

20. Method according to claim 19, wherein said area to be monitored is associated with a first set of cells of said plurality, wherein said sensor configuration covers a subset of the cells to be monitored, the method comprising the steps of:
 a) defining said sensor configuration,
 b) maintaining said usable sensors in said configuration for a predetermined time,
 c) defining a second subset of cells not covered by said first configuration, and
 d) determining a second sensor configuration which maximizes a probability of detecting an event in said second subset, and wherein the sensors of said plurality which are not used for performing said surveillance function are used for performing a second surveillance function on a second area to be monitored.

21. Method according to claim 18, wherein said area to be monitored is associated with a first set of cells of said plurality, and wherein said sensor configuration covers a subset of the cells to be monitored, the method comprising the steps of:
 a) defining said sensor configuration,
 b) maintaining said usable sensors in said configuration for a predetermined time,
 c) defining a second subset of cells not covered by said first configuration, and
 d) determining a second sensor configuration which maximizes a probability of detecting an event in said second subset.

22. Method according to claim 21, wherein if said second configuration does not cover all the cells of said second subset, then steps c) to d) are carried out again until said second subset of cells is null.

23. Method according to claim 22, wherein said predetermined time is set by said control system.

24. Method according to claim 21, wherein said predetermined time is set by said operator.

25. Method according to claim 21, wherein during each calculation of said second configuration the control system finds, among said plurality, those sensors which can be used for performing said surveillance function on said second set of cells.

26. Method according to claim 17, wherein said plurality of sensors comprises a plurality of video cameras, and wherein said surveillance function monitors said area to be monitored through a sequence of images taken by said plurality of video cameras, said configuration being determined under the constraint that video cameras only should be used.

27. Method according to claim 26, wherein said operator specifies a shooting order for the cells associated with said area to be monitored, and wherein said sequence of images is determined by said shooting order.

28. Method according to claim 26, wherein said configuration is conditioned by constraints imposed by said operator on the video cameras that can be used for said function.

29. Method according to claim 1, wherein, for performing said surveillance function, said control system selects the possible position with which the highest monitoring judgment for the area to be monitored is associated, and controls the corresponding sensor by positioning it in said possible position with the highest monitoring judgment.

30. Method according to 1, wherein said control system uses operational research methods for determining the sensors to be controlled for performing said surveillance function and the positions of the sensors to be controlled.

31. Method according to claim 30, wherein said surveillance methods minimize a cost function which is dependent on said monitoring judgments.

32. Method according to claim 1, wherein said model is built graphically through a graphic representation of said cells.

33. Method according to claim 1, wherein said operator defines said cells by selecting a group of pixels from an electronic map of said environment.

34. Method according to claim 33, wherein partly overlapping groups of pixels are grouped into a single cell.

35. Method according to claim 1, wherein the possible positions of said sensors are associated with said cells through a graphic procedure.

\* \* \* \* \*